Sept. 11, 1956  H. ERICKSON  2,762,882
FLOAT CONTROL SWITCH
Filed Oct. 19, 1953  2 Sheets-Sheet 1

Harry Erickson
INVENTOR.

BY *Thomas A. O'Brien*
and *Harvey B. Jacobson*
Attorneys

Sept. 11, 1956  H. ERICKSON  2,762,882
FLOAT CONTROL SWITCH
Filed Oct. 19, 1953  2 Sheets-Sheet 2
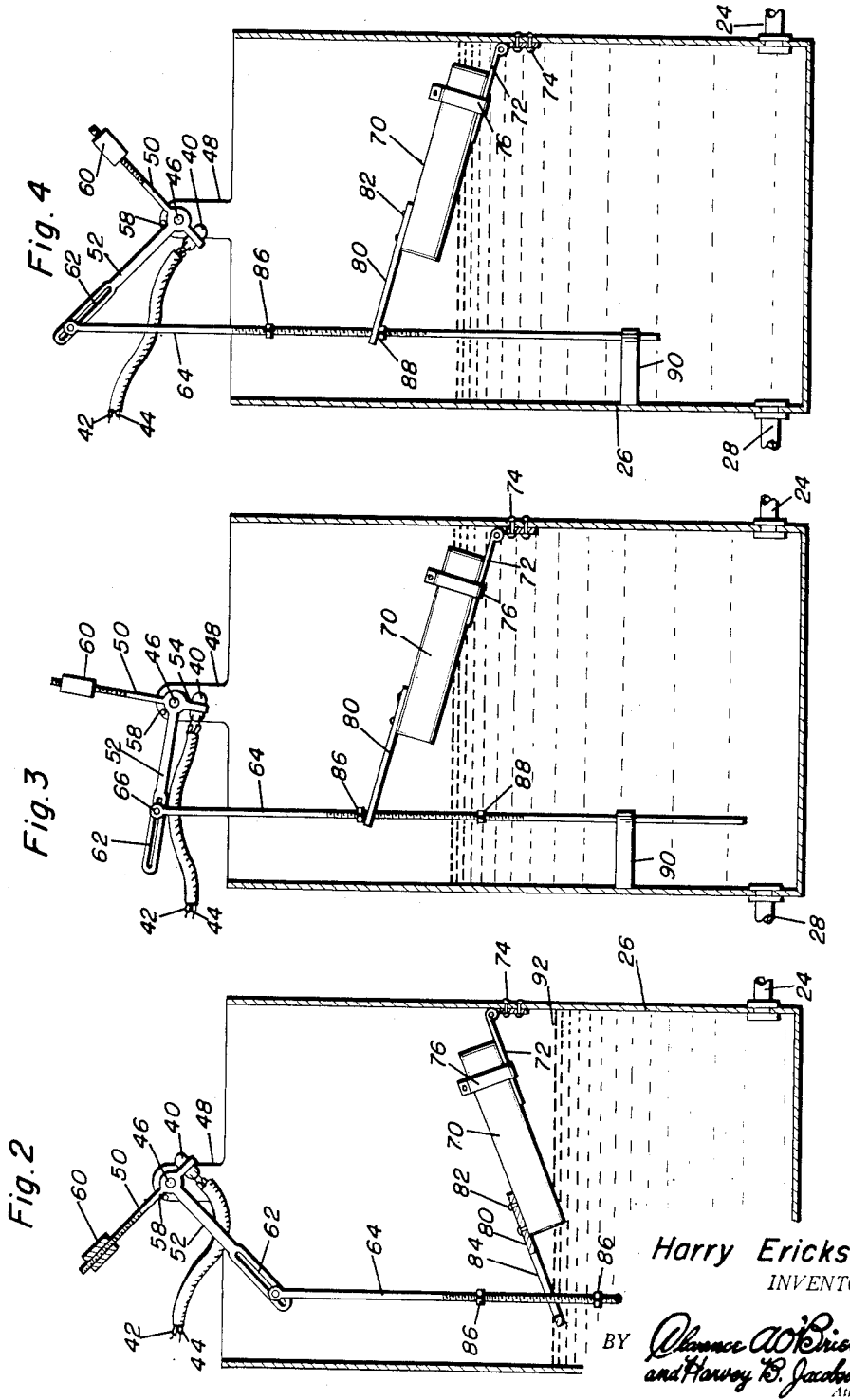
Harry Erickson
INVENTOR.

2,762,882
FLOAT CONTROL SWITCH
Harry Erickson, Lincoln, Nebr.

Application October 19, 1953, Serial No. 386,790

1 Claim. (Cl. 200—84)

This invention relates to a float control switch, and particularly to a float control switch for controlling the level of a fluid such as water in a watering system supplied from a source of water at a different level.

In the operation of watering devices, such as the devices utilized for supplying water to chickens or other animals, it is frequently desirable to maintain the level of the water in the watering receptacles substantially constant and to supply water as needed from any suitable source, such as a creek, well, or other similar source. It has heretofore been proposed to provide relatively large storage tanks and to pump the tanks full of water and use float control valves for supply water from the tank to the receptacles as it is used. However, such construction as the pumping of relatively large quantities of water which frequently becomes stale or contaminated between the time of pumping and the use by the livestock.

It is the purpose of the present invention to provide a control system by which the water will be elevated as needed so that fresh water will be constantly supplied to make up the water utilized by the livestock so that there will be no standing of the water to become stale or contaminated before it is used.

This is accomplished by means of a watering system utilizing a plurality of watering receptacles mounted on the same level and having a control tank mounted on the level of the watering receptacles and having a water level corresponding to the water level in the watering devices. A float control switch, according to the present invention, is provided in the control tank and the float control switch is operatively connected to a driving motor, such as an electric motor which operates a fluid pump for elevating the water into the watering receptacles.

Accordingly, an object of the invention is to provide an improved watering system.

It is a further object of the invention to provide an improved water control system.

It is a further object of the invention to provide an improved float control switch.

Other objects, and many of the attendant advantages of the present invention will be apparent from the following detailed description taken in conjunction with the accompanying drawings in which:

Figure 2 is a sectional elevation through a control tank showing the float control switch in energized position;

Figure 3 is a similar view showing the switch passing dead center and about to switch to off-position; and Figure 4 is a similar view showing the switch in deenergized condition.

Figure 1:
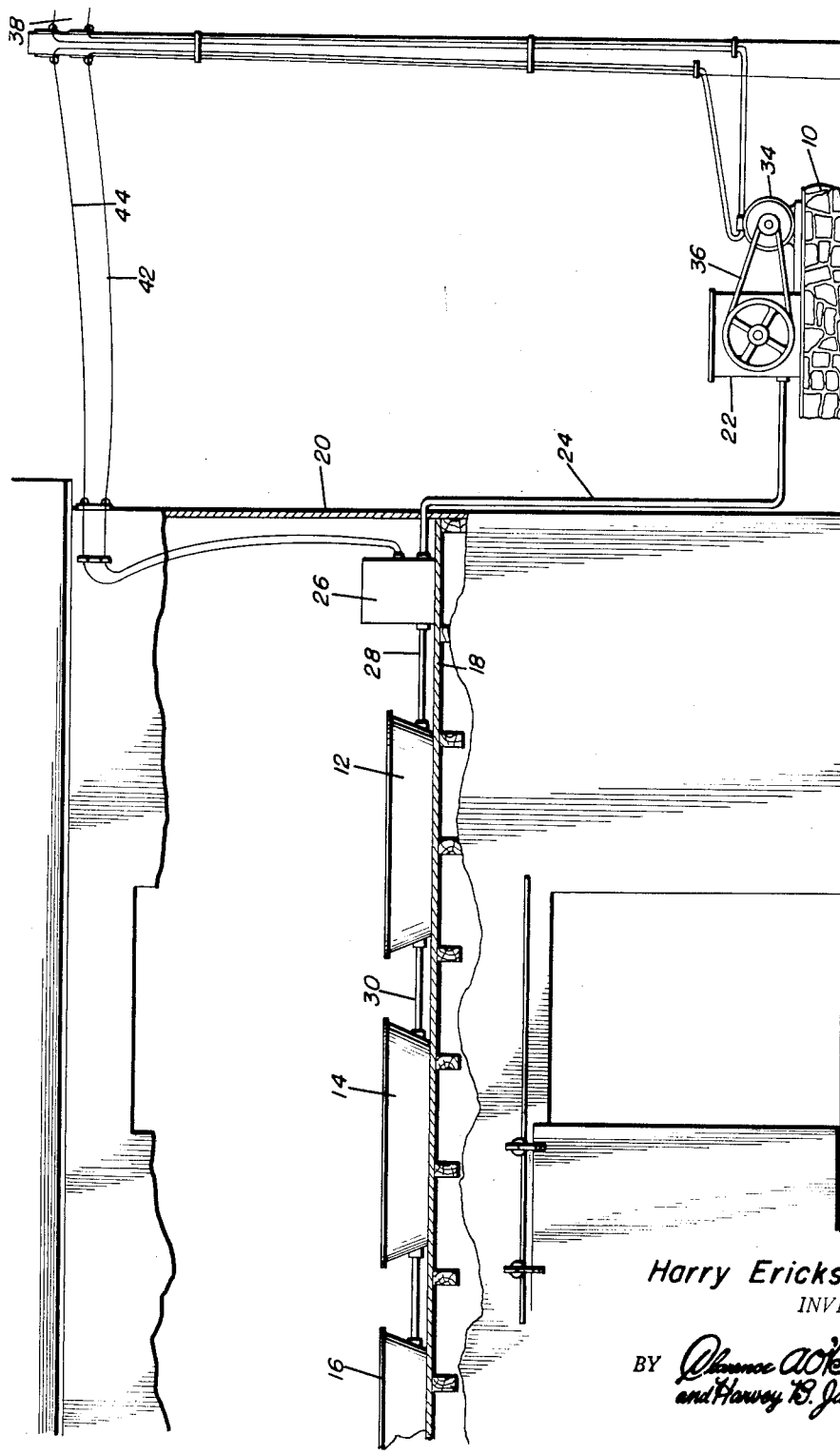
Figure 1 is a schematic illustration of a watering system utilizing the switch according to the invention.

In an exemplary embodiment according to the invention, a source of water 10 comprises a well, cistern, creek or other source of fresh water. A plurality of watering receptacles, such as chicken watering troughs 12, 14 and 16, are mounted on a different level such as the loft floor 18 of a barn 20. A power-driven pump 22 is mounted adjacent to the source of water 10 and is connected to the receptacles by means of a conduit 24 which opens into a control tank 26 which, in turn, is connected to the first receptacle 12 by means of a conduit 28 and the receptacle 12 being similarly connected to the receptacle 14 by a conduit 30. Obviously, any desired number of watering troughs 12 to 16 may be utilized, and all of the tanks will obviously be connected together so that the level in all of the tanks will be identical and they will also be identical with the water or fluid level in the control tank 26.

The pump 22 is driven by a suitable electric motor 34, by a suitable means such as the belt 36. Electrical supply line 38 is connected to the motor 34 to supply energy thereto and the actual supply of energy to the motor 34 is controlled by a switch 40 connected to the motor 34 by means of the conductors 42 and 44.

A fluid level control switch comprises a pivot pin 46 mounted in a suitable ear 48 of a control tank 26 and a bell crank having a substantially upright arm 50 and a laterally extending arm 52 pivoted on the pin 46 having an extension 54 on which is mounted a switch 40. A stop pin 58 is mounted in the ear 48 so that the bell crank member can move only to a limited degree past vertical. In the illustration shown, the arm 50 may move to substantially a 45 degree angle on either side of vertical. A weight member 60 is mounted on the arm 50 at a point above the pivot connection 46, so that the arm 50 is urged in either direction away from the vertical center.

As shown, the switch 40 is mounted so that when the arm 50 is moved to the left, the contact thereof will be closed so that the motor will be energized. Also when the arm 50 is moved to the right, the switch 40 will be open and the motor 34 will be deenergized.

The arm 52 is provided with an elongated slot 62 and an actuating rod 64 is connected to the arm 52 by means of a pin 66 sliding in the slot 62 so that the rod 64 and arm 52 have a slot and pin connection.

A float 70 is mounted in the container 26 and is provided with a hinge 72 which is connected to the side of the container 26 by suitable fasteners such as the rivets 74. The float 70 is adjustable with respect to the end 72 by means of the sliding brackets 76. An elongated ear 80 is mounted on the float 70 by suitable means such as the headed fasteners 82. The ear 80 is provided with an elongated slot 84 and the rod 64 extends freely therethrough. A pair of spaced-apart stops such as the nuts 86 and 88 are placed in spaced-apart relation on the rod 64 on opposite sides of the ear 80. The lower end of the rod 64 is engaged in a guide 90 having a vertical aperture therein in which the rod 64 may freely slide in a substantially vertical direction. In the operation of the device according to the invention, assuming that the livestock has depleted the water in the receptacles 12 to 16, the level will be as indicated at 92 in the container 26 and the float 70 will be in depending position and the arm 50 will be turned to the left because of the actuation of the rod 64 by the float, so that the switch 40 is closed and the motor 34 is rotating the pump 22 to add water to the system. As shown in Figure 3, the rise of the water in the system will cause the float 70 to move about the hinge 72 to assume a position so that the ear 80 is in engagement with the stop 86 and forces the rod 64 upward so that the weight 60 is pushed toward the central or vertical position. As shown in Figure 6, the weight 60 is just passing the vertical position so that the weight 60 will now move the bell crank to extreme right position, as shown in Figure 4 so that the switch 40 will be opened and the rod 64 will be raised upwardly so that the stop 88 now engages the ear 80. Obviously, as the water is depleted, the ear 80 will press on the stop 88 and cause the lifting of the weight 60 until it passes the dead center or vertical position, after which the bell crank will suddenly move to the position originally shown in Figure 2 and again close the switch 40.

It will be obvious that the throw of the switch may be controlled by adjusting the stops 86 and 88, and by adjusting the position of the float 70 on the hinge 72.

It will thus be apparent that the present invention provides a control system in which fresh water will constantly be supplied to the watering receptacles to make up any loss of water therefrom so that the level in the watering receptacles will be maintained substantially constant with fresh water being added thereto.

For purpose of exemplification a particular embodiment of the invention has been shown and described according to the best present understanding thereof. However, it will be apparent to those skilled in the art that various changes and modifications may be made in the arrangement and construction of the parts thereof without departing from the true spirit and scope of the invention.

What is claimed as new is as follows:

A fluid level responsive switch comprising a container adapted to contain a fluid at a variable level, a bell crank pivoted on said container, one arm of said bell crank extending upward, said bell crank having angular movement in opposite directions to dispose said one arm on either side of vertical, a weight mounted on said one arm above the pivot point, a switch mounted on said bell crank, an actuating rod operatively connected to the other arm of said bell crank and extending vertically in said container, a fixed stop on said container between said arms limiting angular movement of the bell crank in opposite directions, a float mounted in said container, an ear mounted on one end of said float and having an elongated slot freely receiving said rod, spaced apart stops on said rod for engagement by said ear to actuate said rod upon rise and fall of said float, said float having a hinge mounting at its other end remote from said ear for rise and fall in accordance with the variations of the fluid level in said container, and a clamp connecting said float to said hinge mounting for adjustment thereon for variable actuation of said rod by said ear under rise and fall of said float.

References Cited in the file of this patent

UNITED STATES PATENTS

| | | |
|---|---|---|
| 1,405,200 | Gaebe | Jan. 31, 1922 |
| 1,925,633 | Gulick | Sept. 5, 1933 |
| 1,941,815 | Ringstrom | Jan. 2, 1934 |
| 2,050,521 | Chapin | Aug. 11, 1936 |
| 2,054,205 | Palmer | Sept. 15, 1936 |
| 2,184,605 | Roberts | Dec. 26, 1939 |
| 2,196,955 | Buntyn | Apr. 9, 1940 |